(12) United States Patent
Keller

(10) Patent No.: US 11,066,047 B1
(45) Date of Patent: Jul. 20, 2021

(54) LED TAIL LIGHT HEATER COVER

(71) Applicant: Keith Keller, Medicine Hat (CA)

(72) Inventor: Keith Keller, Medicine Hat (CA)

( * ) Notice: Subject to any disclaimer, the term of this patent is extended or adjusted under 35 U.S.C. 154(b) by 0 days.

(21) Appl. No.: 16/176,627

(22) Filed: Oct. 31, 2018

(51) Int. Cl.
| | |
|---|---|
| *H05B 3/84* | (2006.01) |
| *B60S 1/02* | (2006.01) |
| *B60Q 1/00* | (2006.01) |
| *B60R 16/03* | (2006.01) |
| *F21V 23/00* | (2015.01) |
| *F21V 23/06* | (2006.01) |
| *F21V 5/04* | (2006.01) |
| *F21V 23/04* | (2006.01) |
| *F21S 43/20* | (2018.01) |
| *F21S 43/14* | (2018.01) |
| *F21S 45/60* | (2018.01) |
| *H05B 3/86* | (2006.01) |
| *F21V 31/00* | (2006.01) |
| *F21Y 115/10* | (2016.01) |

(52) U.S. Cl.
CPC ............ *B60S 1/026* (2013.01); *B60Q 1/0017* (2013.01); *B60R 16/03* (2013.01); *F21S 43/14* (2018.01); *F21S 43/26* (2018.01); *F21S 45/60* (2018.01); *F21V 5/04* (2013.01); *F21V 23/001* (2013.01); *F21V 23/0442* (2013.01); *F21V 23/06* (2013.01); *F21V 31/005* (2013.01); *H05B 3/86* (2013.01); *F21Y 2115/10* (2016.08)

(58) Field of Classification Search
CPC . F21S 45/60; F21S 45/14; F21S 43/26; F21V 5/04; F21V 23/001; F21V 23/0442; F21V 23/06; F21V 31/005; B60S 1/026; B60Q 1/0017; B60R 16/03; H05B 3/86; H05B 3/84

See application file for complete search history.

(56) References Cited

U.S. PATENT DOCUMENTS

| | | | |
|---|---|---|---|
| 6,563,086 B1 * | 5/2003 | Meirndorf | ................ H05B 3/84 219/220 |
| 7,410,267 B2 * | 8/2008 | Mochizuki | .............. B29C 70/82 219/202 |
| 7,587,289 B1 | 9/2009 | Sivertsen | |
| 8,011,794 B1 | 9/2011 | Sivertsen | |
| 8,217,306 B2 * | 7/2012 | Inoue | ................... F21S 48/1145 219/202 |

(Continued)

*Primary Examiner* — Arman B Fallahkhair
(74) *Attorney, Agent, or Firm* — Orin Del Vecchio

(57) ABSTRACT

An apparatus for prevention of accumulation of snow and/or ice on an LED light of a motor vehicle comprising a lens containing a resistive conductor material in a pattern, electrical terminations operably connected to the resistive conductor material and to direct current power generated by the motor vehicle to power the LED lights, a mounting frame sized to surround and seal the LED light; and wherein the pattern is selected to minimally obscure light projecting through the lens. A method for prevention of accumulation of snow and/or ice on an LED light of a motor vehicle comprising electrically connecting direct current power generated by the motor vehicle to electrical terminals operably connected to a resistive conductive material contained within a lens; and sealably securing a frame with the lens therein to the motor vehicle over the LED light of the motor vehicle such that light from the LED light is viewable therethrough.

11 Claims, 2 Drawing Sheets

(56) References Cited

U.S. PATENT DOCUMENTS

| | | | |
|---|---|---|---|
| 8,399,805 B2* | 3/2013 | Biddell | A42B 3/245 |
| | | | 219/203 |
| 8,459,848 B2* | 6/2013 | Marley | G02B 27/0006 |
| | | | 362/521 |
| 9,623,790 B2* | 4/2017 | Van Straten | F21S 8/085 |
| 9,709,238 B2* | 7/2017 | Dunn | F21S 41/141 |
| 2005/0156103 A1 | 7/2005 | May et al. | |
| 2013/0249375 A1 | 9/2013 | Panagotacos et al. | |

* cited by examiner

LED TAIL LIGHT HEATER COVER

BACKGROUND OF THE INVENTION

1. Field of Invention

This invention relates to the removal of snow and ice from LED lights. More particularly, this invention relates to an apparatus and method for attaching the apparatus to LED tail lights on a vehicle.

2. Description of Related Art

One of the inventors operates trucks used for commercial hauling in Canada. When the trucks are fitted with LED tail lights there is a problem with snow and ice accumulation. Unlike conventional tail lights which generate a small amount of heat when the they are operated, the LED tail lights generate so little heat that even if they are cleaned prior to operation, one cannot be assured that snow and ice will not accumulate thereon while the LEDs are on, and while the vehicle is being driven on the roadway during winter driving conditions. Obviously driving a vehicle have obscured tail lights is unsafe.

SUMMARY OF THE INVENTION

According to a first embodiment of the present invention there is disclosed an apparatus for prevention of accumulation of snow and/or ice on an LED light of a motor vehicle comprising a lens containing a resistive conductor material in a pattern, electrical terminations operably connected to the resistive conductor material and to direct current power generated by the motor vehicle to power the LED lights, a mounting frame sized to surround and seal the LED light; and wherein the pattern is selected to minimally obscure light projecting through the lens.

The lens may be formed of a transparent material selected from a group of glass or polycarbonate. The lens may be formed in a circular shape.

The mounting frame may be formed in a circular ring shape, adapted to retain the lens therein and to surround the LED light. The mounting frame may further include an LED light. The lens and the frame may be outwardly shaped similarly to a lamp unit on a particular motor vehicle so as to replace a standard light fixture on the particular motor vehicle.

The apparatus may further comprise a thermostatically controlled sensor and switch to selectively supply power to the resistive conductor material.

According to a further embodiment of the present invention there is disclosed a method for prevention of accumulation of snow and/or ice on an LED light of a motor vehicle comprising electrically connecting direct current power generated by the motor vehicle to electrical terminals operably connected to a resistive conductive material contained within a lens; and sealably securing a frame with the lens therein to the motor vehicle over the LED light of the motor vehicle such that light from the LED light is viewable therethrough.

The direct current power may be selectively supplied to the resistive conductive material through a switch. The switch may be selectively activated by a thermostatically controlled sensor.

The method may further comprise removing an existing lamp unit on the motor vehicle and wherein the frame may include an LED light.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
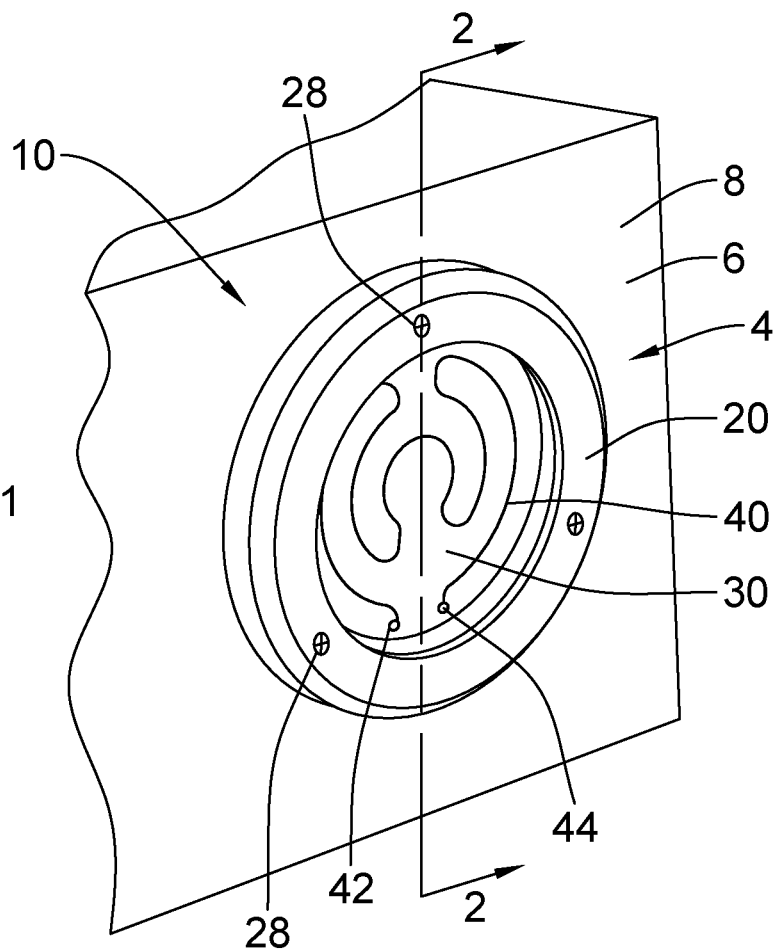
FIG. 1 is a perspective view of a partial perspective view of a LED heater mounted on a rear bumper of a trailer of the type hauled by an eighteen-wheeler tractor.

Referring to FIG. 1, an apparatus for prevention of accumulation of snow and/or ice on an LED light of a motor vehicle according to a first embodiment of the invention is shown generally at 10 mounted on a rear bumper 8 of a vehicle 6. The apparatus 10 comprises a frame 20 with a lens 30 therein. The frame 20 is adapted to sealably cover an LED light 4 on the vehicle 6. The lens 30 includes a resistive conductive material 40 operably connected to the vehicle direct current power supply so as to produce sufficient heat to melt snow and ice thereon.

Figure 2:
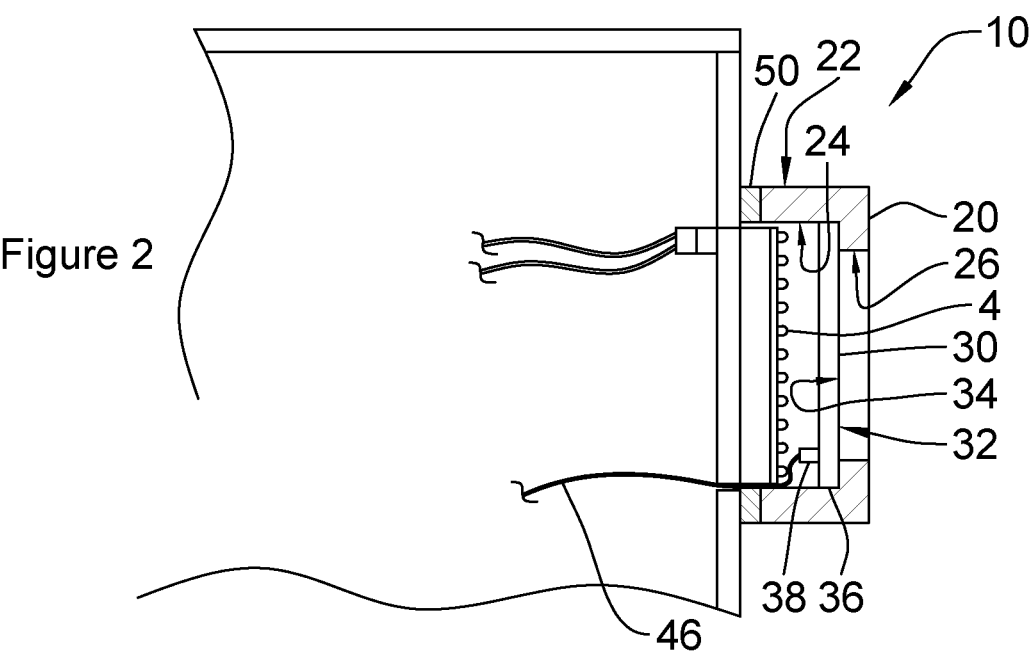
FIG. 2 is a cross sectional view of the LED heater taken along line 2-2 of FIG. 1.

Referring to FIGS. 1 and 2, the lens 30 is formed in a circular shape with a transparent material such as, by way of non-limiting example, glass or polycarbonate, such that light from the LED light 4 may pass therethrough. Although the lens is illustrated as a circular shape in the present embodiment of the invention, it will be appreciated that other shapes, such as, by way of non-limiting example, square, rectangular or oval, may be useful, as well. The lens has front and rear surfaces, 32 and 34, respectively, with an outside edge 36. The resistive conductive material 40 may be applied to either the front or rear surface, 32 or 34, or may, alternately, be embedded within the lens 30, as is commonly known. The resistive conductive material 40 is arranged in a pattern to minimally obscure light passing through the lens 30, such as, by way of non-limiting example, joined concentric circles, as illustrated in FIG. 1, although other patterns may be useful for other lens shapes.

As illustrated in FIG. 1, the resistive conductive material 40 includes first and second ends, 42 and 44, respectively, to which direct current power and ground terminals may be operably connected. FIG. 2 illustrates one of such electrical terminals 38 on the rear surface 44 of the lens 30, connected to the second end 44 of the resistive conductive material 40. The electrical terminals 38 are electrically connected with wires 46 to the vehicle direct power source, by means as are commonly known. A temperature sensor (not shown) may be included on the lens 30 or frame 20 and connected to a thermostat switch (not shown) operably positioned between the electrical terminals 38 and the direct power source such that power is supplied to the resistive conductive material 40 only when the temperature sensor reads below a specified temperature.

The frame 20 is formed in a shape to retain the outside edge 36 of the lens 30 therein. In the present embodiment of the invention, the frame 20 is formed in a circular ring shape, although other frame shapes may be adapted for the selected lens shape, as is commonly known. The frame 20 has outside and inside surfaces, 22 and 24, respectively, with an inside opening edge lip 26 sized to retain the outside edge 36 of the lens 30 thereunder such that the lens 30 engages upon the inside surface 24 of the frame 20. The edge 36 of the lens 30 may be retained under the inside opening edge lip 36 by means as are commonly known, such as, by way of non-limiting example, adhesive or retaining clips. The frame 20 includes a plurality of mounting holes 28 extending therethrough to mount the frame 20 to the vehicle 6 by means as are commonly known.

A seal 50 adapted to match the outer profile of the frame 20 may optionally be positioned between the frame 20 and the vehicle 6 to seal the LED light 4 within the joined frame 20 and lens 30. The seal 50 prevents ingress of moisture or debris. The seal 50 may be formed using a material such as, by way of non-limiting example, Silicone, Nitrile or Rubber, although other materials may be useful, as well.

Figure 3:
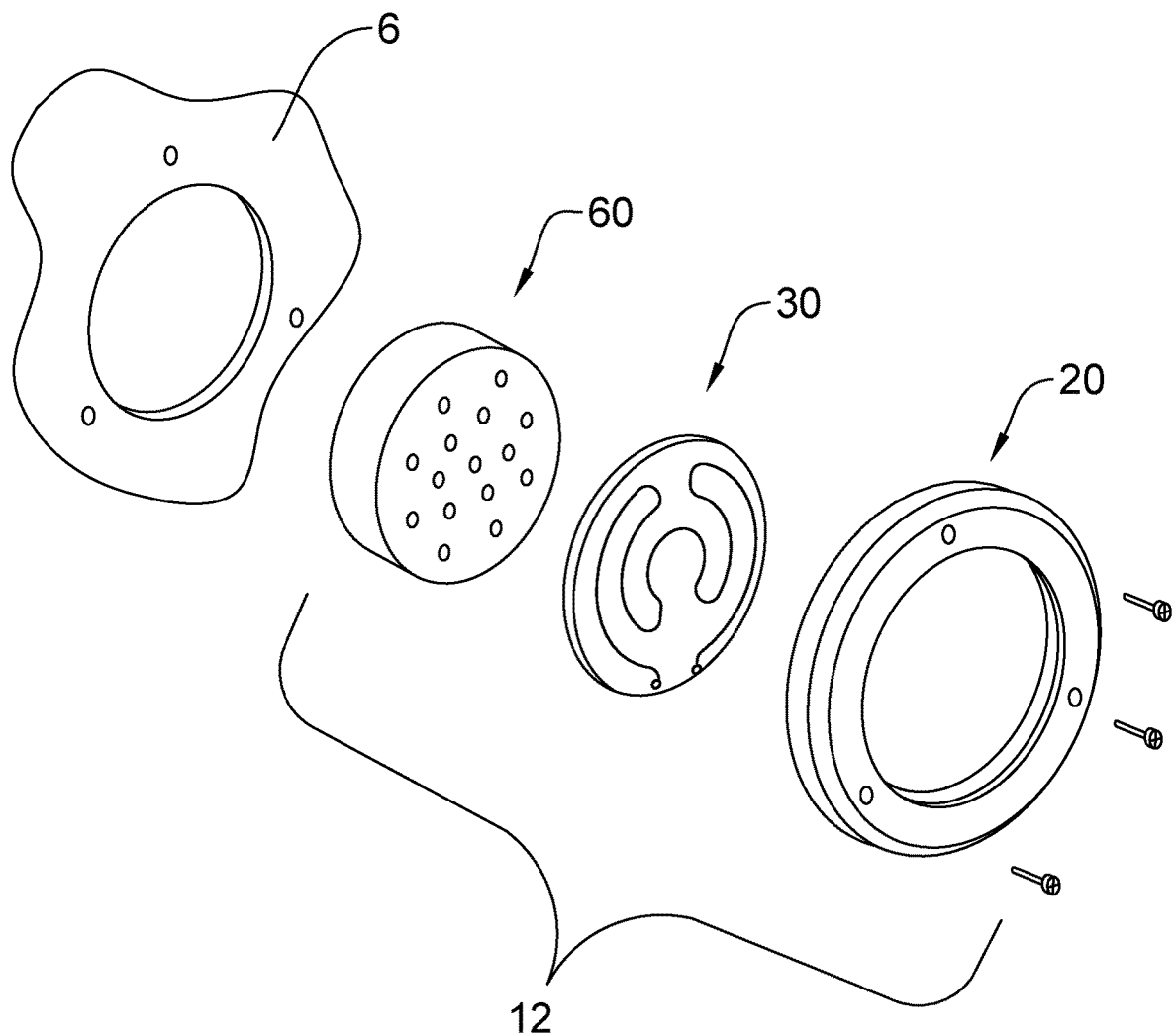
FIG. 3 is an exploded perspective view of the LED heater of FIG. 1 with a replacement LED light.

Turning now to FIG. 3, a standard motor vehicle light may be replaced with an LED lamp unit 60 adapted to be retained within the frame 20 with the lens 30 therebetween. The combined apparatus 12 is outwardly shaped sufficiently similar to a lamp unit on a particular vehicle 6 so that it can be used to replace a conventional non-LED light on a vehicle 6. It is noted that for the combined apparatus 12 to be able to replace a conventional non-LED light on a vehicle 6 not only the attachment size and structure must be sufficiently similar, but additionally the electrical connector used to receive the controlled power line for the light must be compatible.

To utilize the apparatus 10, wires 46 extending from the electrical terminals 38 are operable connected to the electrical power of the vehicle 6 by means as are commonly known, such that power is supplied when the vehicle 6 is running, and power is shut off when the vehicle 6 is not running. A sensor and thermostat switch may be included, as outlined above, within the electrical connections, as is commonly known. The apparatus 10 is positioned adjacent to the LED light 4 on the vehicle 6 such that heat is provided to the lens 30 over the LED light 4. If a sensor is included, the power is supplied only when the temperature is below a selected temperature, thereby melting any snow or ice thereon. Optionally, a conventional non-LED light may be removed from a vehicle 6 prior to installation, and a combined apparatus 12, including an LED lamp unit 60 as illustrated in FIG. 3, is installed on the vehicle 6.

While specific embodiments of the invention have been described and illustrated, such embodiments should be considered illustrative of the invention only and not as limiting the invention as construed in accordance with the accompanying claims.

What is claimed is:

1. An apparatus for prevention of accumulation of snow and ice on an LED light of a motor vehicle comprising:
    a lens, the lens having a perimeter shape which matches a perimeter shape of the LED light, the lens containing a resistive conductor material arranged in a shaped pattern, said pattern having a shape matching the perimeter shape of said LED light and said lens, and said pattern comprising an arrangement of nested concentrically aligned elements of the resistive conductor material, with both ends of the resistive conductor material located on an outermost one of the concentrically aligned elements;
    electrical terminals operably connected to said resistive conductor material and to direct current power generated by the motor vehicle to power the LED lights;
    a mounting frame sized to surround and seal the LED light; and
    wherein said shaped pattern of the resistive conductor material is operative to minimally obscure light projecting through said lens.

2. The apparatus of claim 1 wherein the perimeter shape of said lens is a circle and said shaped pattern of the resistive conductor material comprises an arrangement of nested, concentrically aligned and substantially circular elements.

3. The apparatus of claim 2 wherein said mounting frame is formed in a circular ring shape, adapted to retain said lens therein and to surround the LED light.

4. The apparatus of claim 1 wherein said mounting frame further includes an LED light.

5. The apparatus of claim 4 wherein said lens and said frame are outwardly shaped similarly to a lamp unit on a particular motor vehicle so as to replace a standard light fixture on said particular motor vehicle.

6. The apparatus of claim 1 wherein said lens is formed of a transparent material selected from a group of glass or polycarbonate.

7. The apparatus of claim 1 further comprising a thermostatically controlled sensor and switch to selectively supply power to said resistive conductor material.

8. A method for prevention of accumulation of snow and ice on an LED light of a motor vehicle comprising:
    electrically connecting direct current power generated by the motor vehicle to electrical terminals operably connected to a resistive conductive material contained within a lens, the lens having a perimeter shape which matches a perimeter shape of the LED light, and said resistive conductor material arranged in a shaped pattern, said shaped pattern having a shape matching the perimeter shape of said LED light and said lens and said pattern comprising an arrangement of nested, concentrically aligned elements of the resistive conductor material with both ends of the resistive conductor material located on an outermost one of the concentrically aligned elements; and
    sealably securing a frame with said lens therein to the motor vehicle over the LED light of the motor vehicle such that light from the LED light is viewable therethrough and said shaped pattern of the resistive conductor material is operative to minimally obscure light projecting through said lens.

9. The method of claim 8 wherein said direct current power is selectively supplied to said resistive conductive material through a switch.

10. The method of claim 9 wherein said switch is selectively activated by a thermostatically controlled sensor.

11. The method for claim 8 further comprising:
    removing an existing lamp unit on the motor vehicle; and
    wherein said frame includes an LED light.

* * * * *